United States Patent [19]

Toms

[11] Patent Number: 4,919,449

[45] Date of Patent: Apr. 24, 1990

[54] VEHICLE REAR SUSPENSION

[75] Inventor: Geoffrey S. Toms, Newport Pagnell, England

[73] Assignee: General Motors Corporation, Detroit, Mich.

[21] Appl. No.: 275,875

[22] Filed: Nov. 25, 1988

[51] Int. Cl.⁵ ............................................ B60G 11/36
[52] U.S. Cl. ................................... 280/688; 280/718; 280/699
[58] Field of Search .............. 280/688, 689, 772, 676, 280/675, 788, 718, 699, 137, 135, 724

[56] References Cited

U.S. PATENT DOCUMENTS

| | | | |
|---|---|---|---|
| 3,596,923 | 8/1971 | Nakamura | 280/718 |
| 4,738,466 | 4/1988 | Mikina | 280/688 |
| 4,802,689 | 2/1989 | Hoffmann | 280/688 |
| 4,817,973 | 4/1989 | Takeda | 280/688 |

*Primary Examiner*—Richard A. Bertsch
*Attorney, Agent, or Firm*—Dean L. Ellis

[57] ABSTRACT

A vehicle rear suspension includes a rucher-like mechanism providing one connection of the semi-elliptic spring, or link equivalent of the suspension linkage to the vehicle sprung mass. The mechanism incorporates pivots and spring means effective to enable rear wheel roll understeer during vehicle cornering, while also absorbing impact forces acting on a rear wheel as the wheel hits a bump.

13 Claims, 4 Drawing Sheets

VEHICLE REAR SUSPENSION

This invention relates to a rear suspension for a vehicle.

It is sometimes desired when tailoring a vehicle design for various particular performance that the rear suspension of the vehicle be designed so as to impart some steering movement to the rear wheels during cornering, in the same direction as that in which the front wheels have been turned, thus creating an understeer condition.

An example of a rear suspension capable of producing such rear wheel understeer in a reactive or "passive" way, is one in which the rear wheels of the vehicle are mounted on a rigid rear axle and have their suspension movement controlled by generally longitudinally extending semi-elliptic springs having spring front eyes disposed at a lower level than the respective spring rear eye centers, such that the resulting suspension geometry causes the respective rear road wheel to be moved forwardly during jounce (bump) travel, and rearwardly during rebound travel. Thereby, when the vehicle is rounding a curve and the vehicle body or like superstructure rolls relative to the longitudinal direction of the vehicle towards the outer side of the curve, the rear road wheel on the outer side of the curve experiences jounce (bump) travel, and so is caused to move forwardly, and the rear road wheel on the inner side of the curve experiences rebound travel, and so is caused to move rearwardly. This is known as roll understeer.

However, in order to reduce forces transmitted into the vehicle body when a rear road wheel hits a bump, it would be desirable also for a rear road wheel to be caused to move with a rearward component of movement on hitting a bump, so as to provide some cushioning of the impact.

These two requirements, namely of producing rear wheel roll understeer and of cushioning impacts on the rear road wheels, have however hitherto been considered to be mutually exclusive. The present invention is concerned with a vehicle rear suspension which is indeed capable of a roll understeer effect, yet also provides impact absorption when a rear wheel hits a bump.

To this end a vehicle rear suspension in accordance with the present invention incorporates a rocker-like mechanism serving for one connection of the suspension to the vehicle sprung mass, and comprising a strategically located pivot for suspension linkage on such mass along with further strategically located resilient means responsive to force inputs between the sprung and unsprung masses in such a way as to control roll steer yet absorb road impact forces.

A rear suspension in accordance with the present invention also makes it possible to provide a controlled amount of lateral force understeer in a vehicle. Lateral force understeer can be advantageous in that it is not subject to the time lag often inherent in roll understeer.

An advantageous feature of a rear suspension in accordance with the present invention, when utilizing the above-mentioned suspension geometry with a longitudinally oriented leaf spring and a low-mounted front spring eye, is that a sufficient rear wheel understeer effect can be achieved without the need for the front spring eye to be mounted at such a low level as to prejudice design flexibility in the overall layout of the rear portion of the vehicle.

The vehicle rear suspension in accordance with the present invention is applicable primarily to passenger cars, vans and light trucks, where the benefits of enhanced ride can provide improved passenger comfort. The suspension is in principle also applicable to heavy vehicles such as trucks, although in an application to a heavy vehicle of this type the benefits of enhanced ride could be expected to be less noticeable.

The vehicle rear suspension in accordance with the present invention is not limited in its application to vehicles having a rigid rear axle, since it is also applicable to vehicles having independent rear suspensions. Also, the vehicle rear suspension in accordance with the present invention is not limited in its application to vehicles having rear semi-elliptic springs or like types of leaf spring. The vehicle rear suspension may for example be a four-link type of suspension (thus, having upper and lower generally longitudinally extending control arms), or a MacPherson-type suspension (thus, including an upright suspension strut integral with a rear wheel carrier), inasmuch as such suspensions have a member which controls the fore and aft location of the rear axle, and is thus capable of transmitting the forces arising at the rear wheel centers to the pivotal housing member of the vehicle rear suspension in accordance with the present invention.

Figure 1:
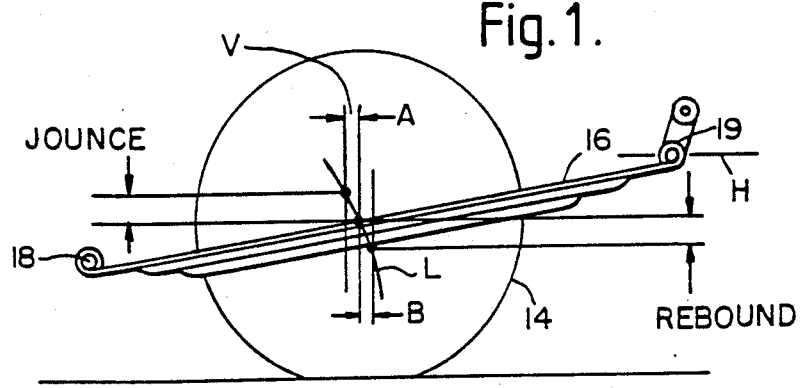
FIG. 1 is a schematic side view of a prior-art type of semi-elliptic leaf spring suspension for a rear road wheel of a vehicle, illustrating the locus of movement of the wheel center during cornering, for giving a roll understeer effect.
Figure 2:
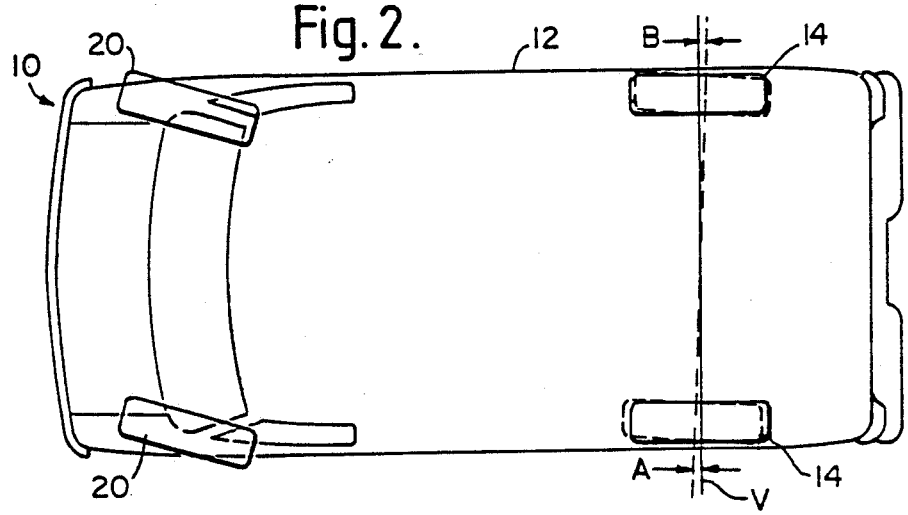
FIG. 2 is a schematic plan view of a motor vehicle, illustrating conventional roll understeer of a pair of rear rad wheels as the vehicle rounds a curve.

In the drawings, FIGS. 1 and 2 illustrate how the conventional roll understeer effect is achieved in a prior-art form of vehicle rear suspension utilizing semi-elliptic leaf springs as the suspension primary elastic medium.

As is shown in FIGS. 1 and 2, a motor vehicle 10 has a body 12 that is resiliently mounted with respect to a pair of rear road wheels 14, forming part of the vehicle unsprung mass, by means of a rear suspension arrangement comprising a pair of generally longitudinally extending semi-elliptic leaf springs 16. In its central region, each of the leaf springs 16 is secured to an axle member (which is a conventional rigid rear axle, not shown in detail) for the associated rear road wheel 14.

The front end of each of the leaf springs 16 has a spring front eye 18 that is secured in conventional fashion by way of a resilient bushing (not shown) to a portion of the vehicle body or sprung mass 12 at a location lower than a horizontal plane H that passes through a spring rear eye 19 at the rear end of the respective spring, with the rear end of each of the leaf springs 16 being shackle-mounted to the vehicle chassis or body spring mass.

The result of using this arrangement involving a low-mounted front end for each of the rear suspension leaf springs is that the locus L of movement of each rear wheel 14 during jounce (bump) and rebound movements is asymmetrical with respect to a vertical plane V that passes through the wheel centers of the rear road wheels 14 in the static condition shown.

Specifically, from the static (center) position, the illustrated amount of jounce (bump) movement of a rear road wheel 14 as shown in FIG. 1 produces a forward component of movement of the wheel center through a distance A, and, conversely, the illustrated amount of rebound movement of the rear road wheel 14 produces a rearward component of movement of the wheel center through a distance B. That is, when a rear road wheel moves upwardly with respect to the vehicle body, it also moves forwardly, and, conversely, when the wheel moves downwardly with respect to the vehicle body, it also moves rearwardly.

FIG. 2 illustrates the resulting understeering effect achieved when the vehicle is rounding a right-hand bend. The vehicle body 12 rolls to the left, relative to the longitudinal direction of the vehicle, so causing jounce movement of the left-hand rear road wheel 14, such that this left-hand wheel is moved forwardly from its center position through the distance A that is also shown in FIG. 1, and conversely causing rebound movement of the right-hand rear road wheel 14, such that this right-hand wheel is moved rearwardly from its center position through the distance B that is also shown in FIG. 1. The vertical plane V passing through the wheel centers of the rear road wheels 14 is thereby caused to pivot from its static position shown as a solid line in FIG. 2 to a roll-understeer position shown as an interrupted line in FIG. 2, so providing a roll-induced steering movement of the rear road wheels in the same direction as that in which the front road wheels 20 have been turned. This is the conventional roll understeer condition.

Figure 3:
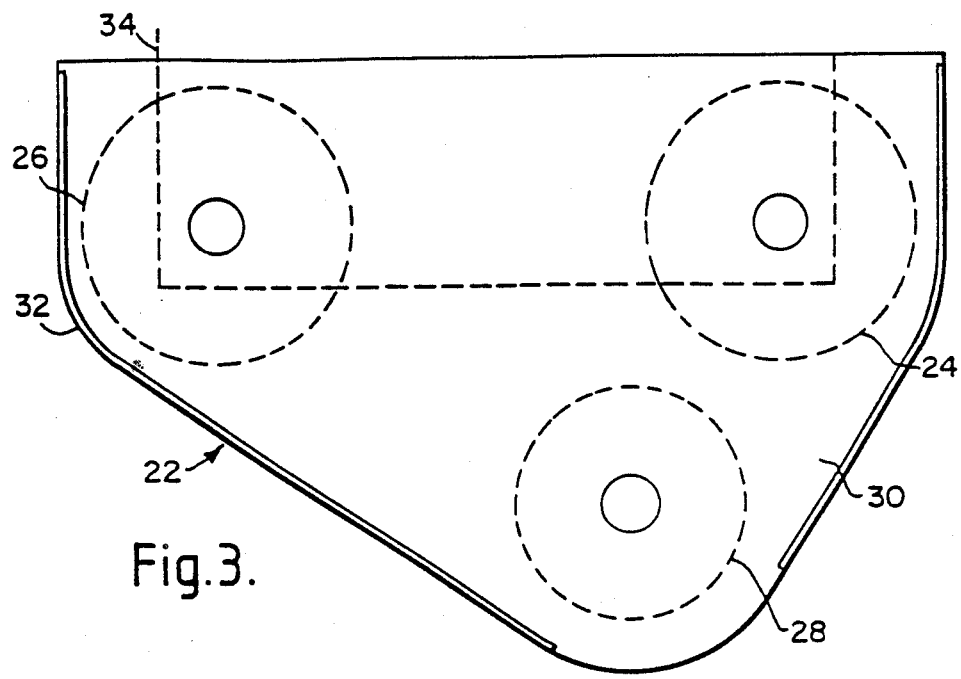
FIG. 3 is a side view of mechanism forming part of a preferred embodiment of a rear suspension in accordance with the present invention.
Figure 4:
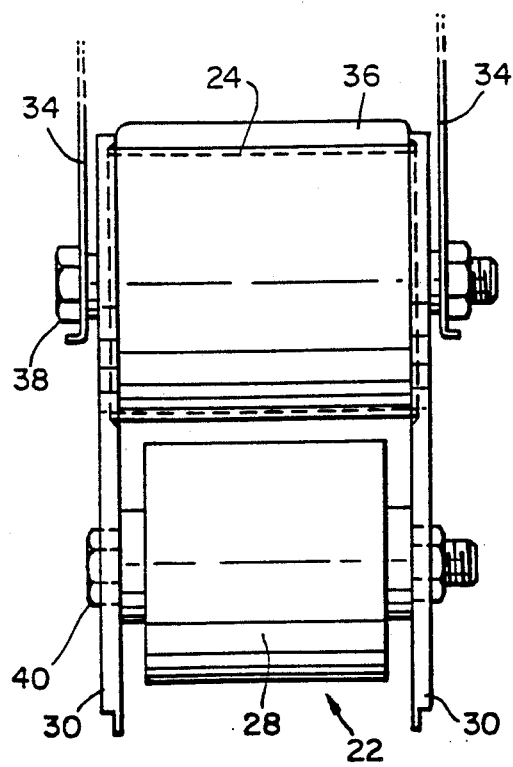
FIG. 4 is a rear view of the mechanism shown in FIG. 3.

FIGS. 3 and 4 of the drawings illustrate a rocker-type mechanism forming part of a preferred embodiment of a rear suspension in accordance with the present invention, constituting an "active" connection between a vehicle body and the front spring eye of a generally longitudinally extending rear leaf spring of the vehicle, for the purpose of reducing the magnitude of road-generated forces transmitted into the vehicle body.

Specifically, the rocker-type mechanism shown in FIGS. 3 and 4 is designated generally 22, and essentially comprises a first resilient annular bush (bushing) 24, a second resilient annular bush 26, and a third resilient annular bush 28, these three resilient annular bushes 24, 26 and 28 being mounted between a pair of side plates 30 of a U-section housing 32 that is rockably mounted between a pair of depending body brackets 34 secured to a longitudinal frame member 35 (FIG. 5) forming part of the body 12 of the vehicle.

The bushes 24, 26 and 28 are conventional annular double-bonded suspension-type resilient bushes each comprising a rubber sleeve that is bonded externally to a large-diameter thin-wall steel tube (having a diameter of 60 to 80 mm) and bonded internally to a small-diameter steel center tube that is longer than the large-diameter tube and the rubber sleeve. The rubber of the sleeve is cored laterally in a conventional fashion to provide the stiffness required in each radial plane.

The large-diameter steel tubes of the bushes 24 and 26 are a press fit in respective tubes 36 that are each welded across the U-section housing 32 to form locations for the bushes 24 and 26, and the small-diameter steel center tubes of these bushes 24 and 26 accommodate threaded bolts 38 which project through corresponding pairs of aligned apertures in the side plates 30 to clamp the respective center tubes between the side plates 30.

Figure 5:
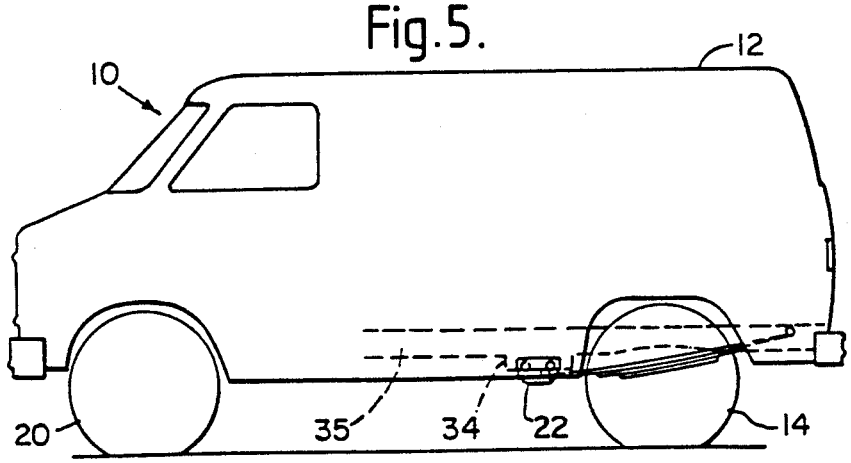
FIG. 5 is a schematic side view of a vehicle having a rear suspension in accordance with the present invention, illustrating the location of the mechanism shown in FIG. 3.

Correspondingly, the small-diameter steel center tube of the bush 28 is clamped between the side plates 30, at a lower location than the bushes 24 and 26, by means of a threaded bolt 40, with the outer diameter of this lower bush 28 being a press fit in a front spring eye 18 (omitted from FIG. 4 for clarity) of a semi-elliptic rear leaf spring 16 of a vehicle 10 as shown generally in FIG. 5, the bush 28 having working clearance laterally between the side plates 30 of the U-section housing 32.

The first bush 24 forms a pivot bush for the rocker-type mechanism 22, the third bush 28 forms a connecting bush providing a connection to the front spring eye 18 of the respective rear leaf spring 16 of the vehicle, and the second bush 26 forms a control bush for resiliently controlling pivotal movement of the rocker-type mechanism 22.

A corresponding semi-elliptic rear leaf spring and rocker-type mechanism (not shown) are disposed at the other side of the vehicle.

Figure 6:
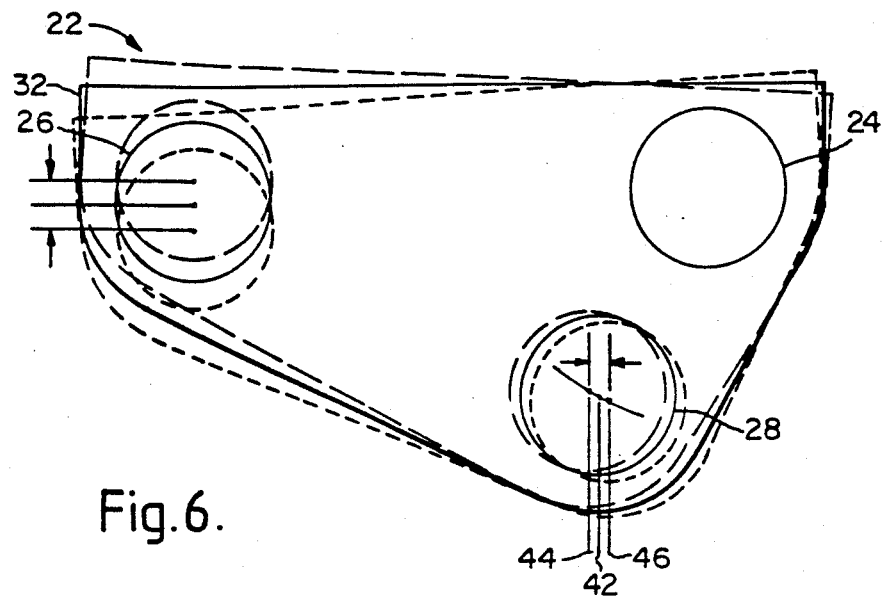
FIG. 6 is a schematic side view of the mechanism shown in FIG. 3, but illustrating operation of the mechanism during cornering of the vehicle.

FIG. 6 illustrates the operation of the rocker-type mechanism 22.

When the vehicle is stationary, the reaction to the weight of the vehicle comprises a force acting vertically upwards from the ground at each tire contact patch. The rear leaf springs, such as the leaf spring 16 shown in FIG. 5, each form in this respect in effect a rigid link effective to transmit this vertically upwardly acting reaction force from the respective rear wheel and thereby provide a corresponding force acting in a vertically upward direction at the center of the respective front spring eye 18, and thus at the center of the connecting bush 28. With this static force acting vertically upwardly at the center of the connecting bush 28, the U-section housing 32 of the rocker-type mechanism 22 is resiliently maintained by the front bush 26, namely the control bush, in the solid-line (static) position shown in FIG. 6, with the center of the connecting bush 28 at the position denoted by the reference numeral 42 in FIG. 6.

When the vehicle is moving, in addition to the vertical reaction force at the tire contact patch, each tire of a rear wheel of the vehicle is also subject to a rolling resistance force acting in the fore-and-aft direction of the vehicle, as well as a lateral force due to irregularities of the tire construction, these two latter forces being relatively small in relation to the vertical reaction force. During cornering, when the vehicle is rounding a bend, a rear wheel is further subject to a laterally acting cornering force, which may be a relatively large force. The overall reaction force acting on a rear wheel at the tire contact patch is the resultant of these various forces.

As previously discussed in relation to FIG. 1, body roll occurring during cornering produces the arcuate locus of movement L of each rear wheel center as shown in FIG. 1, with the rear wheel on the outside of the curve moving upwardly and forwardly, and the rear wheel on the inside of the curve moving downwardly and rearwardly, relative to the vehicle body. The leaf spring 16, acting effectively as a rigid link, transmits the vertical component of the forces acting on the associated rear wheel to the connecting bush 28 of the rocker-type mechanism 22, so causing pivotal movement of the U-section housing 32 as resiliently controlled by the front bush 26.

FIG. 6 shows how the center of the connecting bush 28 is thereby moved from its static position 42 along an arc about the center of the pivot bush 24, to either a position 44 (jounce position) due to the static force plus the increased force on the outside wheel during cornering, or alternatively to a position 46 (rebound position) due to the static force plus the force on the inside wheel during cornering. This produces corresponding pivotal movement of the U-section housing 32, as resiliently controlled by the control bush 26, either to a "jounce" position denoted in FIG. 6 by long broken lines, or alternatively to a "rebound" position denoted in FIG. 6 by short broken lines.

Figure 7:
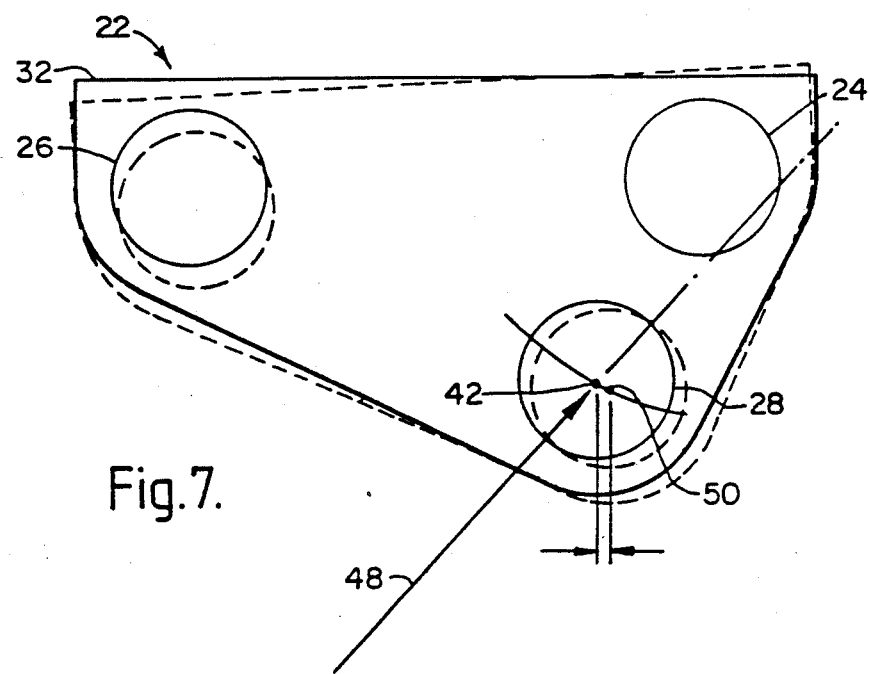
FIG. 7 is a schematic side view similar to FIG. 6, but illustrating operation of the mechanism when the respective rear road wheel hits a bump.

FIG. 7 illustrates the action of the rocker-type mechanism 22 when a rear wheel of the vehicle hits a bump on the surface of the road or other terrain being traversed by the vehicle.

Under such conditions, the rear wheel will be subject to a bump force having both vertically and horizontally acting components, and so the line of action of the resultant reaction force at the rear wheel center, instead of extending essentially vertically upwardly as previously described, will extend essentially obliquely rearwardly, and will be reflected at the connecting bush 28 as an obliquely directed force acting in the direction of arrow 48. The line of action of this force, as indicated by the dot-dash line in FIG. 7, passes the center of the pivot bush 24 on the opposite side from the vertically directed forces illustrated in FIG. 6, so that the couple produced tends to cause the movement of the U-section housing 32 to take place in an anti-clockwise direction (as viewed in FIG. 7), under the resilient control of the control bush 26, such that a rearward component of movement is thereby imparted to the associated rear wheel, so moving the wheel center to a position such as that denoted 50 in FIG. 7. This rearward movement of the rear wheel, under the resilient control action of the control bush 26, cushions the impact force acting on the rear wheel due to the rear wheel hitting the bump, and so provides improved ride comfort for the occupants of the vehicle.

The rocker-type mechanism 22 offers additional advantages in effectively permitting tuning of lateral force understeer at a rigid rear axle. Current practice is for a rigid rear axle utilizing leaf-type suspension springs to have a rubber-bushed spring eye at the front end of the spring, with a shackle at the rear, this arrangement causing the lateral stiffness of the rear of the spring to be less than the lateral stiffness of the front. During cornering of a vehicle having a suspension of this kind, the lateral cornering force acting at the center of each leaf-type rear suspension spring causes the rear of the spring to deflect laterally by a greater amount than the front of the spring, so creating lateral force oversteer. When the rocker-type mechanism 22 in conformity with the present invention is used at the front end of the spring, however, there is scope for providing a lateral stiffness at the front end of the spring which is less than that at the rear. The low lateral stiffness can be achieved by the use of bushes designed to have low lateral and coning rates. This would not affect their principal function, which is controlled by the radial rate of the bushes. In this context, the "coning" rate of a bush is the rate in respect of orbital or processional movement of the center axis at the ends of the bush such that the locus of movement of the center axis corresponds to the conical surfaces of a pair of cones having their apices adjacent one another at the center of the bush.

It is possible for the specific embodiment which has been described to be modified within the scope of the present invention. Reference has already been made to the possibility of application to an independent rear suspension, and to a rear suspension utilizing rigid pivotal-link members rather than leaf-type suspension springs to transmit forces to the rocker-type mechanism. Further, the described downwardly open U-section housing 32 could be replaced by an upwardly open type of housing, and instead of the connecting bush 28 being disposed at a level lower than the pivot bush 24 and control bush 26, it could be disposed at a level higher than these two bushes.

FIGS. 8 to 14 are fragmentary side views forming general illustrations of alternative rear suspension layouts possible within the scope of the present invention.

Figure 8:
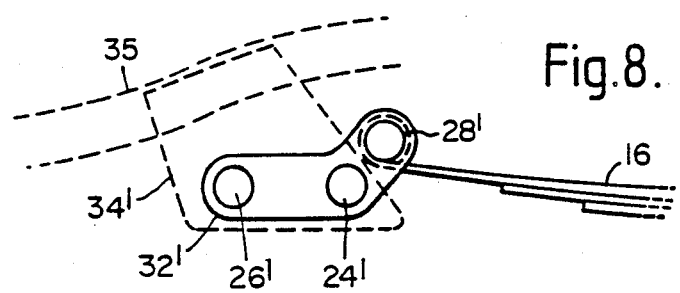
FIGS. 8 to 14 are fragmentary side views illustrating alternative rear suspension layouts within the scope of the present invention.

FIG. 8 illustrates a layout in which the connecting bush 28' is arranged at a higher level than the pivot bush 24' and control bush 26'. Also, the U-section housing 32' and the depending body brackets 34' have shapes different from those shown in FIG. 3.

Figure 9:
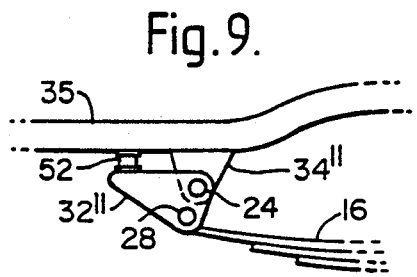

FIG. 9 illustrates a layout in which the control bush is replaced by a double-bonded sandwich-type resilient mount 52, with the connecting bush 28 arranged at a lower level than the pivot bush 24. The U-section housing 32" and the depending body brackets 34" have shapes different from those shown in FIG. 3.

Figure 10:
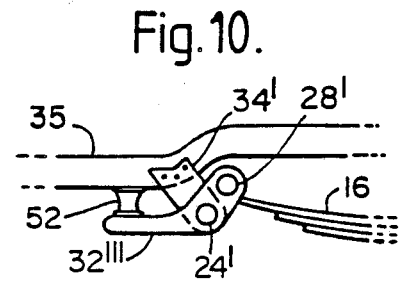

FIG. 10 illustrates a layout in which the control bush is replaced by a double-bonded sandwich-type resilient mount 52, and the connecting bush 28' is arranged at a higher level than the pivot bush 24' The U-section housing 32''' and the depending body brackets 34' have shapes different from those shown in FIG. 3.

Figure 11:
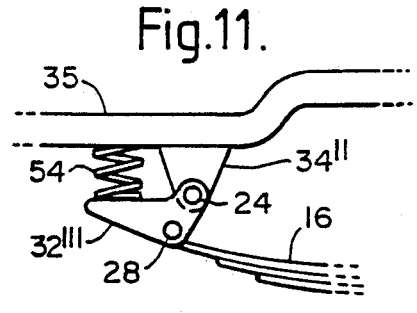

FIG. 11 illustrates a layout in which the control bush is replaced by a helical coil spring 54, with the connecting bush 28 arranged at a lower level than the pivot bush 24. The U-section housing 32'''and the depending body brackets 34" have shapes different from those shown in FIG. 3.

Figure 12:
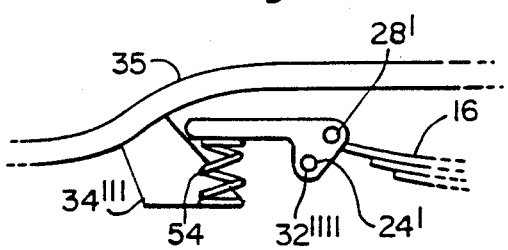

FIG. 12 illustrates a layout in which the control bush is replaced by a helical coil spring 54 and the connecting bush 28' is arranged at a higher level than the pivot bush 24'. The U-section housing 32"" and the depending body brackets 34''' have shapes different from those shown in FIG. 3.

Figure 13:
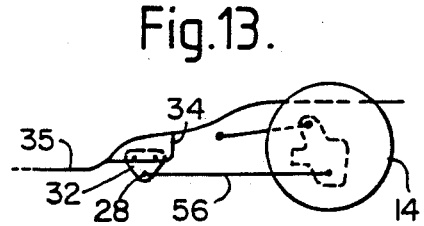

FIG. 13 illustrates a four-link type of layout in which a lower relatively rigid pivotal link 56 provides the connection from a wheel carrier of the rear axle of the vehicle to the connecting bush 28 of the U-section housing 32.

Figure 14:
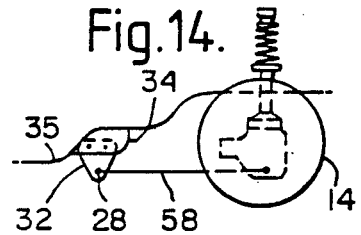

FIG. 14 illustrates a MacPherson strut type of layout in which a generally longitudinally extending relatively rigid pivotal link 58 provides the connection from a wheel carrier of the rear axle of the vehicle to the connecting bush 28 of the U-section housing 32.

The embodiments of the invention in which an exclusive property or privilege is claimed are defined as follows:

1. In a vehicle rear suspension, the combination comprising, a housing member, a mounting pivot pivotally mounting said housing member to the sprung mass of the vehicle, resilient control means between the housing member and the sprung mass subject to deflection during pivotal movement of the housing member relative to the sprung mass about said pivot, a wheel carrier for a rear wheel of the vehicle, resilient suspension means connecting the wheel carrier to the sprung mass, said suspension means being arranged to be operative to provide a rear wheel roll steer effect during cornering of the vehicle, and to that end including link means extending from the wheel carrier to the housing member at a location spaced from said pivot, and means connecting said link means to the housing member such that reaction forces acting on the rear wheel in a generally vertical direction are transmitted by the link to the housing member to tend to cause pivotal movement of the housing member in a first rotary sense under the control of the resilient means, whereby to modify said roll steer effect, whereas obliquely rearwardly directed impact forces acting on the rear wheel are transmitted by the link means to the housing member to tend to cause pivotal movement of the housing member in a second rotary sense opposite to the first rotary sense with a consequent rearward movement of the rear wheel which is resiliently opposed by said resilient control means.

2. A vehicle rear suspension according to claim 1, in which a bracket on the sprung mass supports said pivot.

3. A vehicle rear suspension according to claim 1 or 2, in which said pivot comprises an annular resilient bush member.

4. A vehicle rear suspension according to claim 1 in which the resilient control means comprises an annular resilient bush member.

5. A vehicle rear suspension according to claim 1 in which the housing member comprises a U-section member including a facing pair of side flanges.

6. A vehicle rear suspension according to claim 1 or 2, in which said pivot and the resilient means each comprise an annular resilient bush member, the housing member comprises a downwardly open U-section member having a pair of facing side flanges formed with pairs of aligned apertures, first and second tubes are secured across the U-section housing in the region of adjacent pairs of the aligned apertures, and the resilient bush members of the pivot and the resilient means are press-fitted into respective ones of the first and second tubes.

7. A vehicle rear suspension according to claim 1, in which the suspension means link means comprises a semi-elliptic spring that extends in a direction generally longitudinally of the vehicle, the semi-elliptic spring has a front spring eye and a rear spring eye, the spring is mounted with the front spring eye disposed at a lower level than the rear spring eye, and the front spring eye is pivotally connected to said connecting means with the housing member.

8. A vehicle rear suspension according to claim 1, in which said connecting means is disposed at a lower level than said pivot and said resilient control means.

9. A vehicle rear suspension according to claim 1 or 2, in which the resilient control means comprises an elastomeric body.

10. A vehicle rear suspension according to claim 1 or 2, in which the resilient control means comprises a helical coil spring.

11. A vehicle rear suspension according to claim 1 or 2, in which the suspension means comprises a four-link suspension, and at each side of the vehicle a lower relatively rigid pivotal link of the four-link suspension connects the wheel carrier of the rear axle to the connecting means with the housing member.

12. A vehicle rear suspension according to claim 1 or 2, in which the suspension means comprises a vertically oriented strut and a generally longitudinally extending pivotal link connecting the wheel carrier of the rear axle to the connecting means with the housing member.

13. A vehicle rear suspension according to claim 1 wherein said suspension means is arranged to provide a rear wheel roll understeer effect during cornering of the vehicle.

* * * * *